United States Patent
Wang et al.

(10) Patent No.: US 10,237,124 B2
(45) Date of Patent: Mar. 19, 2019

(54) NETWORK OPERATION, ADMINISTRATION, AND MAINTENANCE (OAM) METHOD, APPARATUS, AND SYSTEM

(71) Applicant: Huawei Technologies Co., Ltd., Shenzhen (CN)

(72) Inventors: Zitao Wang, Nanjing (CN); Qin Wu, Nanjing (CN); Yihong Huang, Nanjing (CN); Liang Xia, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 7 days.

(21) Appl. No.: 15/494,128

(22) Filed: Apr. 21, 2017

(65) Prior Publication Data

US 2017/0230234 A1    Aug. 10, 2017

Related U.S. Application Data (63) Continuation of application No. PCT/CN2015/088793, filed on Sep. 1, 2015.

(30) Foreign Application Priority Data

Oct. 23, 2014    (CN) .......................... 2014 1 0571235

(51) Int. Cl.
    *H04L 12/24*    (2006.01)
(52) U.S. Cl.
    CPC ...... *H04L 41/0686* (2013.01); *H04L 41/0677* (2013.01)
(58) Field of Classification Search
    None
    See application file for complete search history.

(56) References Cited

U.S. PATENT DOCUMENTS

2005/0249119 A1* 11/2005 Elie-Dit-Cosaque ........................ H04L 12/2856
                                                                                           370/236
2008/0016311 A1    1/2008 Harada
(Continued)

FOREIGN PATENT DOCUMENTS

CN          1352429 A     6/2002
CN        101132320 A     2/2008
(Continued)

OTHER PUBLICATIONS

Busi et al., "Operations, Administration, and Maintenance Framework for MPLS-Based Transport Networks," Request for Comments: 6371, Category: Informational, pp. 1-62, Internet Engineering Task Force (IETF), Reston, Virginia (Sep. 2011).

(Continued)

*Primary Examiner* — Diane L Lo
(74) *Attorney, Agent, or Firm* — Leydig, Voit & Mayer, Ltd.

(57) ABSTRACT

This application discloses a network operation, administration, and maintenance (OAM) method, an apparatus, and a system. The method includes: receiving a fault alarm message sent by an MP, where the fault alarm message includes fault information; determining according to the fault alarm message, a first maintenance set to which the MP belongs, where the first maintenance set includes MPs using a first OAM technology; querying an OAM database, to obtain a second maintenance set interacting with the first maintenance set, where the second maintenance set includes MPs using a second OAM technology; and sending a fault notification message to all MPs in the second maintenance set or an MP that is determined according to a policy in the second maintenance set. Therefore, a related fault alarm may be centrally notified on a management plane, and is (Continued)

decoupled from a specific OAM technology, thereby greatly reducing an implementation difficulty.

24 Claims, 4 Drawing Sheets

(56) References Cited

U.S. PATENT DOCUMENTS

| | | | |
|---|---|---|---|
| 2009/0201819 A1* | 8/2009 | Mizutani | H04L 12/185 370/241.1 |
| 2013/0021903 A1 | 1/2013 | Li | |
| 2014/0136685 A1 | 5/2014 | Chan et al. | |

FOREIGN PATENT DOCUMENTS

| | | |
|---|---|---|
| CN | 101174975 A | 5/2008 |
| CN | 101826983 A | 9/2010 |
| CN | 102185711 A | 9/2011 |
| CN | 102231674 A | 11/2011 |
| CN | 102843249 A | 12/2012 |
| CN | 102857362 A | 1/2013 |
| EP | 2528272 A1 | 11/2012 |

OTHER PUBLICATIONS

Li et al., "Stateless Source Address Mapping for ICMPv6 Packets," Request for Comments: 6791, Category: Standards Track, pp. 1-6, Internet Engineering Task Force (IETF), Reston, Virginia (Nov. 2012).

Moore, "Utilizing the SNA Alert in the management of multivendor networks," IBM Systems Journal, vol. 27, No. 1, XP-000811961, pp. 15-30, Armonk, New York (1988).

* cited by examiner

NETWORK OPERATION, ADMINISTRATION, AND MAINTENANCE (OAM) METHOD, APPARATUS, AND SYSTEM

CROSS-REFERENCE TO RELATED APPLICATIONS

This application is a continuation of International Application No. PCT/CN2015/088793, filed on Sep. 1, 2015, which claims priority to Chinese Patent Application No. 201410571235.6, filed on Oct. 23, 2014. The disclosures of the aforementioned applications are hereby incorporated by reference in their entireties.

TECHNICAL FIELD

The present disclosure relates to the field of network technologies, and in particular, to a network operation, administration, and maintenance (OAM) method, an apparatus, and a system.

BACKGROUND

With a rapid increase of network service traffic and service types, networks become more complex, and a higher requirement is imposed on network operation, administration, and maintenance (OAM). More attention is paid to technologies related to fault alarms.

In cross-layer or cross-domain scenarios, different network technologies may be deployed for different layers or different domains. Different network technologies may use different OAM technologies, for example, a connectivity fault management (CFM) technology or a bidirectional forwarding detection (BFD) technology. In these cross-layer or cross-domain scenarios, an existing technology related to fault alarms is bound to a specific OAM technology on a data plane network device. Complex mapping and conversion need to be performed, and implementation is difficult. Therefore, how to better perform a fault alarm in the cross-layer or cross-domain scenarios in which different OAM technologies are used needs to be resolved urgently.

SUMMARY

To better perform a fault alarm in cross-layer or cross-domain scenarios in which different OAM technologies are used, embodiments of the present disclosure provide a network operation, administration, and maintenance (OAM) method, an apparatus, and a system.

According to a first aspect, a network operation, administration, and maintenance (OAM) method is provided, including:

receiving, by a unified OAM management center, a fault alarm message sent by a maintenance point MP, where the fault alarm message includes fault information;

determining, by the unified OAM management center according to the fault alarm message, a first maintenance set to which the MP belongs, where the first maintenance set includes MPs using a first OAM technology;

querying, by the unified OAM management center, an OAM database, to obtain a second maintenance set interacting with the first maintenance set, where the second maintenance set includes MPs using a second OAM technology, and the OAM database saves interaction information of different maintenance sets; and sending, by the unified OAM management center, a fault notification message to all MPs in the second maintenance set or an MP that is determined according to a policy in the second maintenance set, where the fault notification message includes the fault information.

With reference to the first aspect, in a first possible implementation manner, the maintenance set includes a maintenance domain (MD) or a maintenance entity group (MEG).

With reference to the first aspect or the first possible implementation manner of the first aspect, in a second possible implementation manner, the determining, by the unified OAM management center according to the fault alarm message, a first maintenance set specifically includes:

determining, by the unified OAM management center, the first maintenance set according to content of the fault alarm message; or determining, by the unified OAM management center, the first maintenance set according to a source address of the fault alarm message.

With reference to the second possible implementation manner of the first aspect, in a third possible implementation manner, the fault alarm message further includes location information of a fault discovery device and/or location information of a fault reporting device, and the determining, by the unified OAM management center, the first maintenance set according to content of the fault alarm message specifically includes:

determining, by the unified OAM management center, the first maintenance set according to at least one of the fault information, the location information of the fault discovery device, or the location information of the fault reporting device.

With reference to any one of the first aspect or the first to the third possible implementation manners of the first aspect, in a fourth possible implementation manner, before the querying, by the unified OAM management center, an OAM database, to obtain a second maintenance set interacting with the first maintenance set, the method further includes a step of establishing the OAM database, where the establishing, by the unified OAM management center, the OAM database includes:

collecting, by the unified OAM management center, information about MPs in a network managed by the unified OAM management center, where the information about the MPs includes network topology information and information about a used OAM technology that are of the MPs;

establishing, by the unified OAM management center, the maintenance sets according to the information about the MPs; and establishing, by the unified OAM management center, interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs.

With reference to the fourth possible implementation manner of the first aspect, in a fifth possible implementation manner, networks corresponding to the maintenance sets that need to perform OAM interaction include at least one same network device or cover a same path.

With reference to any one of the first aspect or the first to the fifth possible implementation manners of the first aspect, in a sixth possible implementation manner, the receiving, by a unified OAM management center, a fault alarm message sent by a maintenance point MP specifically includes:

receiving, by the unified OAM management center, Extensible Markup Language (XML)-form data transferred by the MP by using the Network Configuration Protocol NETCONF, where the XML-form data is obtained by transforming an object of a unified OAM management data model, the unified OAM management data model is generated by using an IETF YANG Data Model format, and the object of the unified OAM management data model carries the fault information.

With reference to any one of the first aspect or the first to the sixth possible implementation manners of the first aspect, in a seventh possible implementation manner, the sending, by the unified OAM management center, a fault notification message to all MPs in the second maintenance set or an MP that is determined according to a policy in the second maintenance set specifically includes:

sending, by the unified OAM management center to all the MPs in the second maintenance set or the MP that is determined according to the policy, the XML-form data transferred by using the NETCONF, where the XML-form data is obtained by transforming the object of the unified OAM management data model, the unified OAM management data model is generated by using the IETF YANG Data Model format, and the object of the unified OAM management data model carries the fault information.

According to a second aspect, an embodiment of the present disclosure provides a unified operation, administration, and maintenance (OAM) management center, including:

a receiving unit, configured to receive a fault alarm message sent by a maintenance point MP, where the fault alarm message includes fault information;

a determining unit, configured to determine, according to the fault alarm message, a first maintenance set to which the MP belongs, where the first maintenance set includes MPs using a first OAM technology;

a processing unit, configured to query an OAM database, to obtain a second maintenance set interacting with the first maintenance set, where the second maintenance set includes MPs using a second OAM technology, and the OAM database saves interaction information of different maintenance sets; and a sending unit, configured to send a fault notification message to all MPs in the second maintenance set or an MP that is determined according to a policy in the second maintenance set, where the fault notification message includes the fault information.

With reference to the second aspect, in a first possible implementation manner, the maintenance set includes a maintenance domain (MD) or a maintenance entity group (MEG).

With reference to the second aspect or the first possible implementation manner of the second aspect, in a second possible implementation manner, the determining unit is specifically configured to: determine the first maintenance set according to content of the fault alarm message; or determine the first maintenance set according to a source address of the fault alarm message.

With reference to the second possible implementation manner of the second aspect, in a third possible implementation manner, the fault alarm message further includes location information of a fault discovery device and/or location information of a fault reporting device, and the determining unit is specifically configured to determine the first maintenance set according to at least one of the fault information, the location information of the fault discovery device, or the location information of the fault reporting device.

With reference to any one of the second aspect or the first to the third possible implementation manners of the second aspect, in a fourth possible implementation manner, the unified OAM management center further includes an establishment unit, where the establishment unit specifically includes:

a collection subunit, configured to collect information about MPs in a network managed by the unified OAM management center, where the information about the MPs includes network topology information and information about a used OAM technology that are of the MPs;

a first establishment subunit, configured to establish the maintenance sets according to the information about the MPs; and a second establishment subunit, configured to establish interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs.

With reference to the fourth possible implementation manner of the second aspect, in a fifth possible implementation manner, networks corresponding to the maintenance sets that need to perform OAM interaction include at least one same network device or cover a same path.

With reference to any one of the second aspect or the first to the fifth possible implementation manners of the second aspect, in a sixth possible implementation manner, the receiving unit is specifically configured to receive XML-form data transferred by the MP by using the Network Configuration Protocol NETCONF, where the XML-form data is obtained by transforming an object of a unified OAM management data model, the unified OAM management data model is generated by using an IETF YANG Data Model format, and the object of the unified OAM management data model carries the fault information.

With reference to any one of the second aspect or the first to the sixth possible implementation manners of the second aspect, in a seventh possible implementation manner, the sending unit is specifically configured to send, to all the MPs in the second maintenance set or the MP that is determined according to the policy, the XML-form data transferred by using the NETCONF, where the XML-form data is obtained by transforming the object of the unified OAM management data model, the unified OAM management data model is generated by using the IETF YANG Data Model format, and the object of the unified OAM management data model carries the fault information.

According to a third aspect, an embodiment of the present disclosure provides a network system, including:

a maintenance point MP, configured to send a fault alarm message to the operation, administration, and maintenance unified OAM management center described above, where the fault alarm message includes fault information;

the unified OAM management center described above, configured to determine, according to the fault alarm message, a first maintenance set to which the MP belongs, where the first maintenance set includes MPs using a first OAM technology; configured to query an OAM database, to obtain a second maintenance set interacting with the first maintenance set, where the second maintenance set includes MPs using a second OAM technology, and the OAM database saves interaction information of different maintenance sets; and configured to send a fault notification message to all MPs in the second maintenance set or an MP that is determined according to a policy in the second maintenance set, where the fault notification message includes the fault information; and all the MPs in the second maintenance set or the MP that is determined according to the policy, configured to perform fault interaction according to the fault notification message.

According to the network operation, administration, and maintenance (OAM) method, the apparatus, and the system that are provided in the embodiments of the present disclosure, a related fault alarm may be centrally notified on a management plane, and is decoupled from a specific OAM technology, thereby greatly reducing an implementation difficulty.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

In the following, embodiments of the present disclosure are described in detail with reference to the accompanying drawings. It should be understood that the embodiments described herein are merely used to illustrate and explain the present disclosure, but are not intended to limit the present disclosure. In addition, the embodiments of the present application and features in the embodiments may be mutually combined in a case in which they do not conflict with each other.

Figure 1:
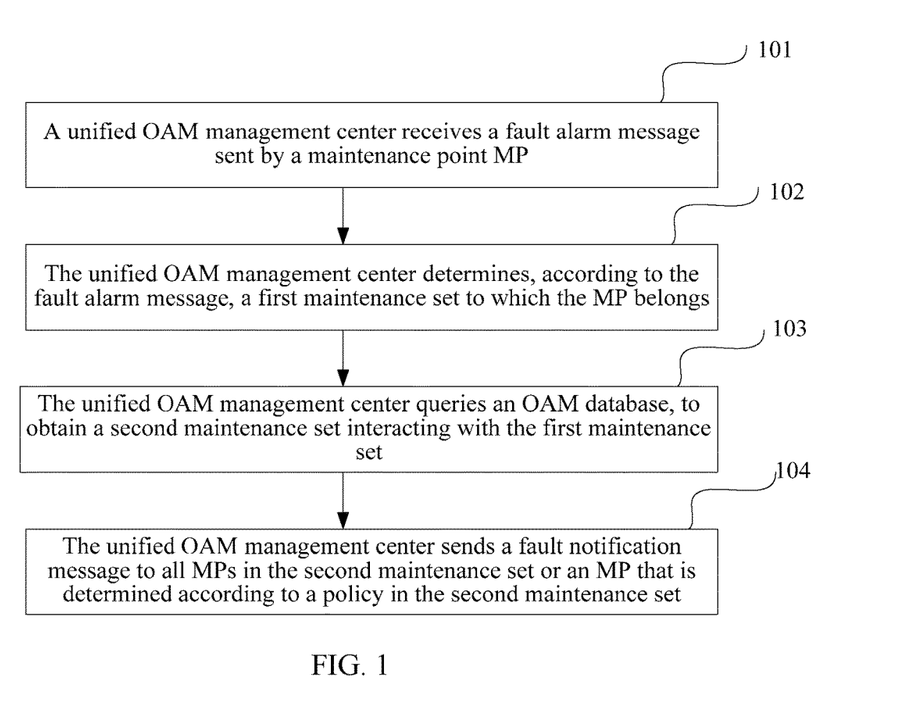
FIG. 1 is a schematic flowchart of a network operation, administration, and maintenance (OAM) method according to an embodiment of the present disclosure.

As shown in FIG. 1, an embodiment of the present disclosure provides a network operation, administration, and maintenance (OAM) method, including:

S101: A unified OAM management center receives a fault alarm message sent by a maintenance point (MP), where the fault alarm message includes fault information.

S102: The unified OAM management center determines, according to the fault alarm message, a first maintenance set to which the MP belongs, where the first maintenance set includes MPs using a first OAM technology.

S103: The unified OAM management center queries an OAM database, to obtain a second maintenance set interacting with the first maintenance set, where the second maintenance set includes MPs using a second OAM technology, and the OAM database saves interaction information of different maintenance sets.

S104: The unified OAM management center sends a fault notification message to all MPs in the second maintenance set or an MP that is determined according to a policy in the second maintenance set, where the fault notification message includes the fault information.

According to the network operation, administration, and maintenance (OAM) method provided in this embodiment of the present disclosure, a related fault alarm may be centrally notified on a management plane, and is decoupled from a specific OAM technology, thereby greatly reducing an implementation difficulty.

Optionally, the maintenance set includes a maintenance domain (MD) or a maintenance entity group (MEG).

Optionally, the determining, by the unified OAM management center according to the fault alarm message, a first maintenance set specifically includes:

determining, by the unified OAM management center, the first maintenance set according to content of the fault alarm message; or determining, by the unified OAM management center, the first maintenance set according to a source address of the fault alarm message.

Optionally, the fault alarm message further includes location information of a fault discovery device and/or location information of a fault reporting device, and the determining, by the unified OAM management center, the first maintenance set according to content of the fault alarm message specifically includes:

determining, by the unified OAM management center, the first maintenance set according to at least one of the fault information, the location information of the fault discovery device, or the location information of the fault reporting device.

Optionally, the fault discovery device and the fault reporting device may be a same network device, that is, the network device discovers a fault and sends the fault alarm message to the unified OAM management center; or the fault discovery device and the fault reporting device may be different network devices. For example, after discovering a fault, the fault discovery device notifies the fault reporting device, and the fault reporting device sends the fault alarm message to the unified OAM management center. The unified OAM management center determines the first maintenance set according to at least one of the fault information, the location information of the fault discovery device, or the location information of the fault reporting device. The determining the first maintenance set according to the fault information may be determining the first maintenance set according to location information of a faulty network device or link in the fault information. The faulty network device or link, the fault discovery device, and the fault reporting device usually belong to one maintenance set. If at least one of the fault information, the location information of the fault discovery device, or the location information of the fault reporting device includes information about the first maintenance set, the first maintenance set may be determined.

Optionally, the fault alarm message may not include the location information of the fault discovery device or the location information of the fault reporting device. The unified OAM management center may obtain, according to the source address of the fault alarm message, for example, a source IP address, information about an MP sending the fault alarm message, for example, information about the first maintenance set to which the MP belongs.

Optionally, before the querying, by the unified OAM management center, an OAM database, to obtain a second maintenance set interacting with the first maintenance set, the method further includes a step of establishing the OAM database.

The establishing, by the unified OAM management center, the OAM database includes:

collecting, by the OAM unified management center, information about MPs in a network managed by the unified OAM management center, where the information about the MPs includes network topology information and information about a used OAM technology that are of the MPs;

establishing, by the unified OAM management center, the maintenance sets according to the information about the MPs; and establishing, by the unified OAM management center, interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs.

Optionally, networks corresponding to the maintenance sets that need to perform OAM interaction include at least one same network device or cover a same path.

Optionally, the receiving, by a unified OAM management center, a fault alarm message sent by a maintenance point MP specifically includes:

receiving, by the unified OAM management center, Extensible Markup Language (XML)-form data transferred by the MP by using the Network Configuration Protocol NETCONF, where the XML-form data is obtained by transforming an object of a unified OAM management data model, the unified OAM management data model is generated by using an IETF YANG Data Model format, and the object of the unified OAM management data model carries the fault information.

Optionally, the sending, by the unified OAM management center, a fault notification message to all MPs in the second maintenance set or an MP that is determined according to a policy in the second maintenance set specifically includes:

sending, by the unified OAM management center to all the MPs in the second maintenance set or the MP that is determined according to the policy, the XML-form data transferred by using the NETCONF, where the XML-form data is obtained by transforming the object of the unified OAM management data model, the unified OAM management data model is generated by using the IETF YANG Data Model format, and the object of the unified OAM management data model carries the fault information.

A network operation, administration, and maintenance (OAM) method provided in another embodiment of the present disclosure is described below with reference to an application scenario of FIG. 2.

Figure 2:
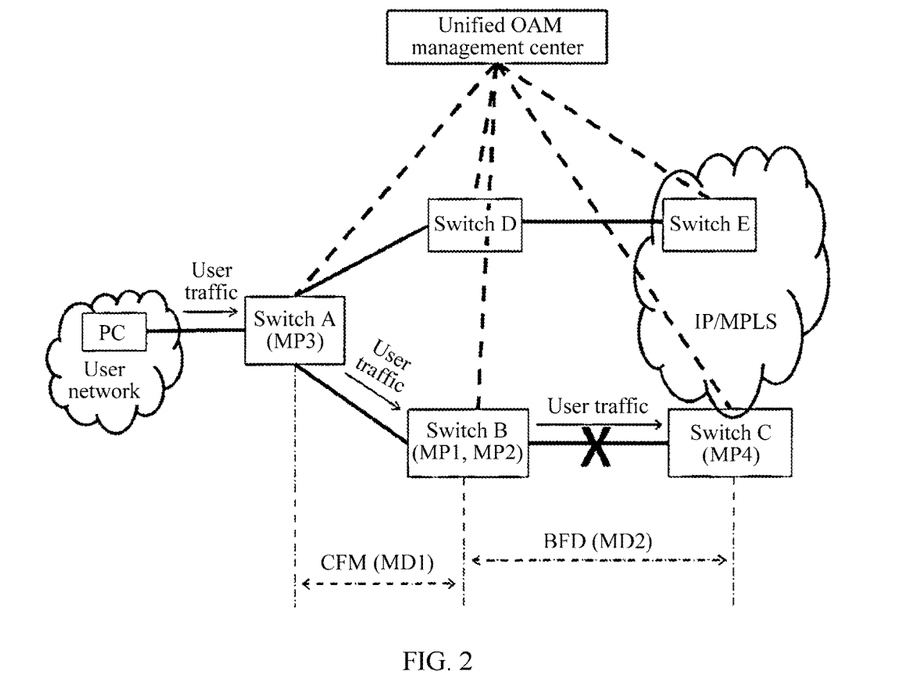
FIG. 2 is a schematic diagram of an application scenario of a network operation, administration, and maintenance (OAM) method according to an embodiment of the present disclosure.

As shown in FIG. 2, CFM is deployed in a network between a Switch A and a Switch B, and BFD is deployed in a network between the Switch B and a Switch C. In this way, when a link from the Switch B to the Switch C is faulty, the remote Switch A cannot sense the link fault between the Switch B and the Switch C, and therefore, still sends user traffic to the faulty link, thereby causing an interruption of the user traffic. According to the network operation, administration, and maintenance (OAM) method provided in this embodiment of the present disclosure, a related fault alarm may be centrally notified on a management plane, and is decoupled from a specific OAM technology, thereby greatly reducing an implementation difficulty. Therefore, it is easier to avoid this case.

A procedure of a network operation, administration, and maintenance (OAM) method in this embodiment of the present disclosure is as follows:

1. A unified OAM management center establishes an OAM database.

The establishing, by the unified OAM management center, the OAM database includes:

11. The unified OAM management center collects information about MPs in a network managed by the unified OAM management center, where the information about the MPs includes network topology information and information about a used OAM technology that are of the MPs.

In this embodiment of the present disclosure, the unified OAM management center is set to centrally manage the network. The unified OAM management center is a logical concept, may be physically an independent network device, for example, a switch or a router, or may be disposed in a network device. The unified OAM management center may be centralized, which is physically an independent network device or is disposed in a network device; or may be distributed, which is physically distributed in multiple independent network devices or is disposed in multiple network devices.

Multiple MPs are disposed in the network in this embodiment of the present disclosure, where the MP is configured to perform OAM detection or OAM measurement. The MP is also a logical concept, and may be physically disposed in a network device, for example, in a switch or a router. One or more MPs may be disposed in a network device, and multiple MPs in a network device may use different OAM technologies.

For example, two MPs are disposed on the Switch B in FIG. 2, namely, an MP1 and an MP2, where the MP1 uses a CFM technology, and the MP2 uses a BFD technology. One MP is disposed on the Switch A, namely, an MP3, where the MP3 uses the CFM technology. One MP is disposed on the Switch C, namely, an MP4, where the MP4 uses the BFD technology. The unified OAM management center may collect information about the MPs, namely, information about the MP1, the MP2, the MP3, and the MP4. The information about the MPs includes network topology information and information about the used OAM technologies that are of the MPs.

12. The unified OAM management center establishes the maintenance sets according to the information about the MPs, where the maintenance set may be an MD or an MEG.

As shown in FIG. 2, the unified OAM management center establishes an MD1, where the MD1 includes MPs using one OAM technology (CFM), namely, the MP3 on the Switch A and the MP1 on the Switch B; establishes an MD2, where the MD2 includes MPs using another OAM technology (BFD), namely, the MP4 on the Switch C and the MP2 on the Switch B.

13. The unified OAM management center establishes interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs. When there is one MP that belongs to one maintenance set on a network device and there are multiple maintenance sets on a network device, multiple MPs that belong to maintenance sets are connective MPs.

The establishing interaction information for a maintenance set that needs to perform OAM interaction may also include establishing an interaction attribute for the maintenance set that needs to perform OAM interaction.

Networks corresponding to the maintenance sets that need to perform OAM interaction include at least one same network device or cover a same path.

As shown in FIG. 2, networks corresponding to the MD1 and the MD2 include a same network device, that is, the Switch B, and same user traffic flows through the MD1 and the MD2. If the MD1 or the MD2 is faulty, the other MD needs to be notified, so that the other MD correspondingly adjusts a flow direction of the user traffic. That is, it is determined that the MD1 and the MD2 need to perform OAM interaction.

The unified OAM management center establishes interaction information for a maintenance set that needs to perform OAM interaction, that is, the MD1 and the MD2. The establishing interaction information for the MD1 and the MD2 includes adding, to a connective MP, an interaction attribute of a connective MP interacting with another maintenance set. For example, in FIG. 2, for the MP1 and the MP2 that are located on the Switch B, the MP1 belongs to the MD1, and the MP2 belongs to the MD2. Because both the MP1 and the MP2 are located on the Switch B, the MP1 and the MP2 may be used as connective MPs. Therefore, the unified OAM management center adds an interaction attribute of "interacting with the MP2" to the MP1, and adds an interaction attribute of "interacting with the MP1" to the MP2.

The establishing interaction information for the MD1 and the MD2 may also include establishing interaction attributes for the MD1 and the MD2, for example, adding an interaction attribute of "interacting with the MD2" to the MD1, and adding an interaction attribute of "interacting with the MD1" to the MD2.

2. As shown in FIG. 2, when the link between the Switch B and the Switch C is faulty, merely as an example herein, the fault in this embodiment of the present disclosure further includes another type of fault such as a network device fault or a node fault, or the fault in this embodiment of the present disclosure includes link performance degradation, network device performance degradation, node performance degradation, or the like. Assuming that the MP4 using the BFD technology on the Switch C first detects the link fault, the MP4 sends a fault alarm message to the unified OAM management center.

Specifically, the unified OAM management center receives XML-form data transferred by the MP4 by using the Network Configuration Protocol (NETCONF). The XML-form data is obtained by transforming an object of a unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule. The fault alarm message includes the fault information. The fault information includes a fault location, a fault status, and fault content. The fault location includes location information of a faulty network device or link, and the like. Optionally, the fault alarm message further includes location information of a fault discovery device and/or location information of a fault reporting device. The location information of the fault discovery device and/or the location information of the fault reporting device includes a node identifier of the fault discovery device and/or a node identifier of the fault reporting device, a first maintenance set to which the fault discovery device and/or the fault reporting device belongs, and the like, for example, a node identifier of the MP4, and an MD to which the MP4 belongs. The unified OAM management center may obtain, according to these pieces of information, information about an MP sending the fault alarm message, for example, information about the first maintenance set to which the fault discovery device and/or the fault reporting device belongs; query an OAM database, to obtain a second maintenance set interacting with the first maintenance set; and send a fault notification message to all MPs in the second maintenance set or an MP that is determined according to a policy in the second maintenance set. Moreover, the unified OAM management center may not send a fault notification message to the fault discovery device and/or the fault reporting device according to these pieces of information. The unified OAM management data model may be:

| +---n defect-condition-notification | |
|---|---|
| +--ro md-index | uint32 |
| +--ro meg-index | uint32 |
| +--ro me-index | uint32 |
| +--ro mp-index | uint32 |
| +--ro meg-oper-status | uint32 |
| +--ro meg-sub-oper-status | uint32 |

The object of the unified OAM management data model is obtained by filling and/or extending a related parameter of the unified OAM management data model according to a specific example. The specific example may be or may be not related to a specific OAM technology. For example, in this embodiment of the present disclosure, the related parameter of the unified OAM management data model is filled and/or extended according to the fault information unrelated to a specific OAM technology, to obtain the object of the unified OAM management data model.

3. After receiving the fault alarm message, the unified OAM management center queries the OAM database, to obtain the MD1 interacting with the MD2.

Specifically, if the establishing interaction information for a maintenance set that needs to perform OAM interaction includes adding, to connective MPs, an interaction attribute of a connective MP interacting with another maintenance set, another connective MP located in a same network device as the connective MP is found according to the interaction attribute of the connective MP, and an interacting MD is found according to an MD to which the connective MP belongs. For example, if the establishing interaction information for the MD1 and the MD2 includes: adding, to the connective MP, that is, the MP1, an interaction attribute of "interacting with the MP2", and adding, to the MP2, an interaction attribute of "interacting with the MP1", the MP1 is found according to an interaction attribute of the MP2, and the MD1 to which the MP1 belongs is found according to the MP1. If the establishing interaction information for a maintenance set that needs to perform OAM interaction also includes establishing an interaction attribute for the maintenance set that needs to perform OAM interaction, for example, adding an interaction attribute of "interacting with the MD2" to the MD1, and adding an interaction attribute of "interacting with the MD1" to the MD2, the MD1 interacting with the MD2 may be directly found according to the interaction attribute of the maintenance set.

4. The unified OAM management center sends a fault notification message to all MPs in the MD1 or an MP that is determined according to a policy, where the fault notification message includes the fault information.

The unified OAM management center sends the fault notification message to all the MPs in the MD1; or the unified OAM management center may send the fault notification message to the MP that is determined according to the policy in the MD1. A specific policy is not limited in this embodiment of the present disclosure, and belongs to the protection scope of this embodiment of the present disclosure. In this embodiment of the present disclosure, the unified OAM management center sends the fault notification message to all the MPs in the MD1, namely, the MP1 and the MP3. The unified OAM management center sends, to the MP1 and the MP3, XML-form data transferred by using the NETCONF. The XML-form data is obtained by transforming an object of a unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule. The fault notification message includes the fault information. The fault information includes a fault location, a fault status, and fault content. The fault location includes location information of a faulty network device or link, and the like. Optionally, if the fault alarm message further includes location information of a fault discovery device and/or location information of a fault reporting device, the fault notification message further includes the location information of the fault discovery device and/or the location information of the fault reporting device. The location information of the fault discovery device and/or the location information of the fault reporting device includes a node identifier of the fault discovery device and/or a node identifier of the fault reporting device, and a first maintenance set to which the fault discovery device and/or the fault reporting device belongs, for example, a node identifier of the MP4, and an MD to which the MP4 belongs. The MP1 and the MP3 may perform fault interaction according to respective statuses, for example, starting a spare channel. The unified OAM management data model may be:

```
+---n defect-condition-spreading
   +---ro md-index                uint32
   +---ro meg-index               uint32
   +---ro me-index                uint32
   +---ro mp-index                uint32
   +---ro meg-oper-status         uint32
   +---ro meg-sub-oper-status     uint32
```

The object of the unified OAM management data model is obtained by filling and/or extending a related parameter of the unified OAM management data model according to a specific example. The specific example may be or may be not related to a specific OAM technology. For example, in this embodiment of the present disclosure, the related parameter of the unified OAM management data model is filled and/or extended according to the fault information unrelated to a specific OAM technology, to obtain the object of the unified OAM management data model.

Optionally, the unified OAM management center may send the fault notification message to another MP located in a same MD as the MP4. For example, the unified OAM management center may send the fault notification message to the MP2.

As for another MP using the BFD technology in the MD2, for example, when the MP2 detects the link fault later, if the MP2 has received the fault notification message sent by the unified OAM management center, the MP2 does not need to send the fault alarm message to the unified OAM management center again. If the MP2 has not received the fault notification message sent by the unified OAM management center, the MP2 may then send the fault alarm message to the unified OAM management center.

Optionally, in this embodiment of the present disclosure, the fault alarm message or the fault notification message may be transferred by using an extended Simple Network Management Protocol (SNMP).

Optionally, in this embodiment of the present disclosure, the unified OAM management center may receive fault alarm messages sent by MPs in the first maintenance set by using a method in the prior art. The fault alarm messages include fault information. The method in the prior art is related to an OAM technology used by the MP. The unified OAM management center queries an OAM database, to obtain a second maintenance set interacting with the first maintenance set, where the second maintenance set includes MPs using a second OAM technology, and the OAM database saves interaction information of different maintenance sets. The unified OAM management center transforms the fault information into an object of a unified OAM management data model. The unified OAM management center sends a fault notification message to all MPs in the second maintenance set or an MP that is determined according to a policy in the second maintenance set. The fault notification message includes the fault information, the fault notification message is XML-form data transferred by using the NETCONF, the XML-form data is obtained by transforming the object of the unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule.

Optionally, in this embodiment of the present disclosure, the unified OAM management center may receive fault alarm messages sent by MPs in the first maintenance set by using a method in the prior art. The fault alarm messages include fault information. The method in the prior art is related to an OAM technology used by the MP. The unified OAM management center queries an OAM database, to obtain a second maintenance set interacting with the first maintenance set, where the second maintenance set includes MPs using a second OAM technology, and the OAM database saves interaction information of different maintenance sets. The unified OAM management center sends a fault notification message to all MPs in the second maintenance set or an MP that is determined according to a policy in the second maintenance set, where the fault notification message includes the fault information. The fault notification message is sent by using the method in the prior art. The method in the prior art is related to an OAM technology used by the MP.

In this way, this embodiment of the present disclosure may compatibly support sending the fault alarm message or the fault notification message by using the method in the prior art, but does not support an MP of a method based on the unified OAM management data model.

Another network operation, administration, and maintenance (OAM) method provided in an embodiment of the present disclosure is described below with reference to an application scenario of FIG. 3.

Figure 3:
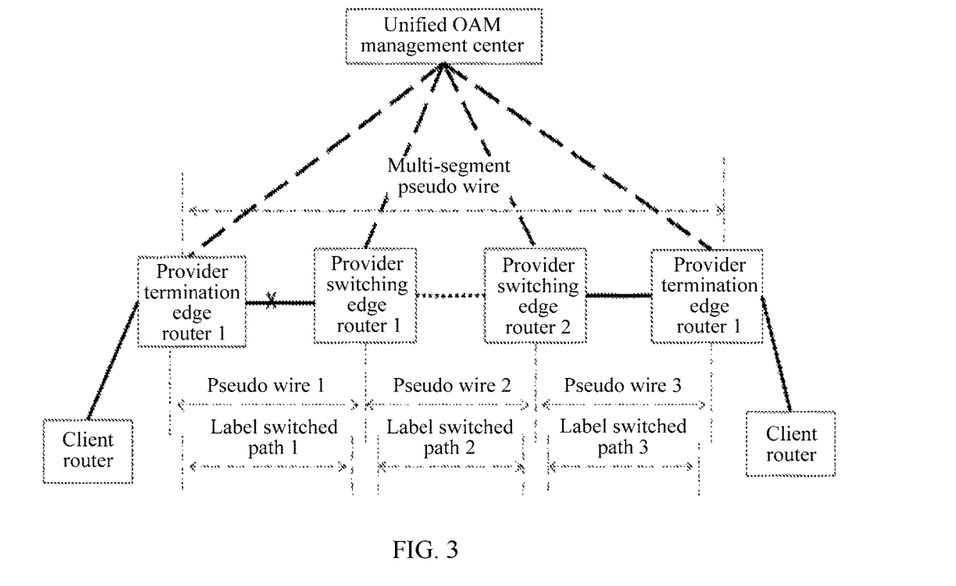
FIG. 3 is a schematic diagram of an application scenario of a network operation, administration, and maintenance (OAM) method according to an embodiment of the present disclosure.

FIG. 3 shows a multi-layer OAM scenario. The bottom layer is a label switched path LSP layer, and then a pseudo wire PW layer and a multi-segment pseudo wire MS-PW layer follow. Certainly, this is merely an example herein. The cross layer may include another layer. Each layer uses an OAM technology corresponding to a network technology of this layer. When a link between a provider termination edge router 1 and a provider switching edge router 1 is faulty, merely as an example herein, a fault in this embodiment of the present disclosure further includes another type of fault such as a network device fault or a node fault, or a fault in this embodiment of the present disclosure includes link performance degradation, network device performance degradation, node performance degradation, or the like. MPs of maintenance sets located on different layers may each detect the link fault, and may each send a fault alarm message. This may cause an alarm storm. According to a network operation, administration, and maintenance (OAM) method in this embodiment of the present disclosure, a related fault alarm may be centrally notified and suppressed on a management plane, and is decoupled from a specific OAM technology, thereby greatly reducing an implementation difficulty. Therefore, it is easier to avoid this case.

Specifically, each router on each layer is provided with an MP. The unified OAM management center may collect information about MPs in a network managed by the unified OAM management center. The information about the MPs includes network topology information and information about a used OAM technology that are of the MPs. The unified OAM management center establishes a maintenance set according to the information about the MPs, where the maintenance set may be an MD, for example, each layer may be allocated to one MD; or the maintenance set may be an MEG, for example, all MPs on layers are allocated to one MD. The layers are distinguished from each other by using different MEGs, that is, each layer is allocated to one MEG. In an MEG, different OAM technologies of different layers are distinguished from each other by using the attribute of MEG-LEVEL.

The unified OAM management center establishes interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs. When there is one MP that belongs to one maintenance set on a network device and there are multiple maintenance sets on a network device, multiple MPs that belong to maintenance sets are connective MPs.

The establishing interaction information for a maintenance set that needs to perform OAM interaction may also include establishing an interaction attribute for the maintenance set that needs to perform OAM interaction.

Networks corresponding to the maintenance sets that need to perform OAM interaction include at least one same network device or cover a same path.

As shown in FIG. 3, network topologies corresponding to maintenance sets on layers cover a same path. When the link fault shown in FIG. 3 occurs, MPs of the maintenance sets on the layers may detect the link fault and send a fault alarm message, thereby causing an alarm storm. Therefore, an MP, which first detects and sends the fault alarm message, of a maintenance set on a layer needs to notify an MP of a maintenance set on another layer, so that the MP of the maintenance set on the another layer performs alarm suppression, and does not send the fault alarm message again. It is determined that maintenance sets on the layers need to perform OAM interaction. In this embodiment of the present disclosure, it may be determined according to a policy that OAM interaction is performed only between maintenance sets on some layers.

The establishing interaction information for a maintenance set that needs to perform OAM interaction includes adding, to connective MPs, an interaction attribute of a connective MP interacting with another maintenance set. For example, in FIG. 3, different maintenance sets are cross layers. Each layer physically cover a same path. A unified OAM management center uses multiple MPs that are on network devices and that belong to different maintenance sets as connective MPs, and adds, to the connective MPs, an interaction attribute of a connective MP interacting with another maintenance set. For example, there are three MPs on a provider termination edge router 1, namely, MP-LSP-T-PE1 that belongs to a maintenance set on an LSP layer, MP-PW-T-PE1 that belongs to a maintenance set on a PW layer, and MP-MS-PW-T-PE1 that belongs to a maintenance set on a multi-segment PW layer. The unified OAM management center uses these MPs as connective MPs, and adds interaction attributes to these connective MPs, that is, adds interaction attributes of "interacting with the MP-PW-T-PE1" and "interacting with MP-MS-PW-T-PE1" to the MP-LSP-T-PE1, adds interaction attributes of "interacting with the MP-LSP-T-PE1" and "interacting with MP-MS-PW-T-PE1" to the MP-PW-T-PE1, and adds interaction attributes of "interacting with the MP-LSP-T-PE1" and "interacting with the MP-PW-T-PE1" to the MP-MS-PW-T-PE1.

The establishing interaction information for a maintenance set that needs to perform OAM interaction may also include establishing an interaction attribute for the maintenance set that needs to perform OAM interaction, for example, adding interaction attributes of "interacting with a maintenance set on the PW layer" and "interacting with a maintenance set on the MS-PW layer" to a maintenance set on the LSP layer, adding interaction attributes of "interacting with the maintenance set on the LSP layer" and "interacting with the maintenance set on the MS-PW layer" to the maintenance set on the PW layer, and adding interaction attributes of "interacting with the maintenance set on the LSP layer" and "interacting with the maintenance set on the PW layer" to the maintenance set on the MS-PW layer.

As shown in FIG. 3, when a link between the provider termination edge router 1 and a provider switching edge router 1 is faulty, assuming that an MP of the maintenance set on the LSP layer, that is, the MP-LSP-T-PE1, first detects the link fault, the MP-LSP-T-PE1 sends a fault alarm message to the unified OAM management center.

Specifically, the unified OAM management center receives XML-form data transferred by the MP-LSP-T-PE1 by using the NETCONF. The XML-form data is obtained by transforming an object of a unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule. The fault alarm message includes the fault information. The fault information includes a fault location, a fault status, and fault content. The fault location includes location information of a faulty network device or link, and the like. Optionally, the fault alarm message further includes location information of a fault discovery device and/or location information of a fault reporting device. The location information of the fault discovery device and/or the location information of the fault reporting device includes a node identifier of the fault discovery device and/or a node identifier of the fault reporting device, a first maintenance set to which the fault discovery device and/or the fault reporting device belongs, and the like, for example, a node identifier of the MP-LSP-T-PE1, an MD to which the MP-LSP-T-PE1 belongs, and an MEG to which the MP-LSP-T-PE1 belongs. The unified OAM management center may obtain, according to these pieces of information, information about an MP sending the fault alarm message, for example, information about the first maintenance set to which the fault discovery device and/or the fault reporting device belongs; query an OAM database, to obtain a second maintenance set interacting with the first maintenance set; and send a fault notification message to all MPs in the second maintenance set or an MP that is determined according to a policy in the second maintenance set. Moreover, the unified OAM management center may not send a fault notification message to the fault discovery device and/or the fault reporting device according to these pieces of information. The unified OAM management data model may be:

|  |  |
|---|---|
| +---n defect-condition-notification | |
| +---ro md-index | uint32 |
| +---ro meg-index | uint32 |
| +---ro me-index | uint32 |
| +---ro mp-index | uint32 |
| +---ro meg-oper-status | uint32 |
| +---ro meg-sub-oper-status | uint32 |

The object of the unified OAM management data model is obtained by filling and/or extending a related parameter of the unified OAM management data model according to a specific example. The specific example may be or may be not related to a specific OAM technology. For example, in this embodiment of the present disclosure, the related parameter of the unified OAM management data model is filled and/or extended according to the fault information unrelated to a specific OAM technology, to obtain the object of the unified OAM management data model.

After receiving the fault alarm message, the unified OAM management center queries the OAM database, to obtain a maintenance set interacting with the maintenance set on the LSP layer, that is, the maintenance set on the PW layer and the maintenance set on the MS-PW layer.

Specifically, if the establishing interaction information for a maintenance set that needs to perform OAM interaction includes adding, to connective MPs, an interaction attribute of a connective MP interacting with another maintenance set, another connective MP located in a same network device as the connective MP is found according to the interaction attribute of the connective MP, and an interacting maintenance set is found according to a maintenance set to which the connective MP belongs. For example, other connective MPs located in a same network device as the MP-LSP-T-PE1 are found according to interaction attributes of "interacting with the MP-PW-T-PE1" and "interacting with the MP-MS-PW-T-PE1" of the MP-LSP-T-PE1 on the LSP layer, namely, the MP-PW-T-PE1 and the MP-MS-PW-T-PE1. Interacting maintenance sets are found according to maintenance sets to which the MP-PW-T-PE1 and the MP-MS-PW-T-PE1 belong, namely, the maintenance set on the PW layer and the maintenance set on the MS-PW layer.

If the establishing interaction information for a maintenance set that needs to perform OAM interaction also includes establishing an interaction attribute for the maintenance set that needs to perform OAM interaction, maintenance sets interacting with the maintenance set on the LSP layer may be directly found according to the interaction attribute of the maintenance set, namely, the maintenance set on the PW layer and the maintenance set on the MS-PW layer.

The unified OAM management center sends a fault notification message to the maintenance sets interacting with the maintenance set on the LSP layer, namely, all MPs in the maintenance set on the PW layer and the maintenance set on the MS-PW layer or an MP that is determined according to a policy. The fault notification message includes the fault information.

The unified OAM management center sends the fault notification message to all the MPs in the maintenance set on the PW layer and the maintenance set on the MS-PW layer; or the unified OAM management center may send the fault notification message to the MP that is determined according to the policy in the maintenance set on the PW layer and the maintenance set on the MS-PW layer. A specific policy is not limited in this embodiment of the present disclosure, and belongs to the protection scope of this embodiment of the present disclosure. In this embodiment of the present disclosure, the unified OAM management center sends the fault notification message to all the MPs in the maintenance set on the PW layer and the maintenance set on the MS-PW layer. The unified OAM management center sends, to an MP that needs to perform fault interaction, XML-form data transferred by using the NETCONF. The XML-form data is obtained by transforming an object of a unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule. The fault notification message includes the fault information. The fault information includes a fault location, a fault status, and fault content. The fault location includes location information of a faulty network device or link, and the like. Optionally, if the fault alarm message further includes location information of a fault discovery device and/or location information of a fault reporting device, the fault notification message further includes the location information of the fault discovery device and/or the location information of the fault reporting device. The location information of the fault discovery device and/or the location information of the fault reporting device includes a node identifier of the fault discovery device and/or a node identifier of the fault reporting device, and a first maintenance set to which the fault discovery device and/or the fault reporting device belongs, for example, a node identifier of the MP-LSP-T-PE1, an MD to which the MP-LSP-T-PE1 belongs, and an MEG to which the MP-LSP-T-PE1 belongs. An MP that needs to perform fault interaction may perform fault interaction according to a status of the MP, for example, performs alarm suppression, and does not send the fault alarm message again when detecting the link fault. The unified OAM management data model may be:

| +---n defect-condition-spreading | |
|---|---|
| +--ro md-index | uint32 |
| +--ro meg-index | uint32 |
| +--ro me-index | uint32 |
| +--ro mp-index | uint32 |
| +--ro meg-oper-status | uint32 |
| +--ro meg-sub-oper-status | uint32 |

The object of the unified OAM management data model is obtained by filling and/or extending a related parameter of the unified OAM management data model according to a specific example. The specific example may be or may be not related to a specific OAM technology. For example, in this embodiment of the present disclosure, the related parameter of the unified OAM management data model is filled and/or extended according to the fault information unrelated to a specific OAM technology, to obtain the object of the unified OAM management data model.

Optionally, the unified OAM management center may send a fault notification message to another MP located in a same maintenance set as the MP-LSP-T-PE1. For example, the unified OAM management center may send the fault notification message to another MP on the LSP layer.

Optionally, in this embodiment of the present disclosure, the fault alarm message or the fault notification message may be transferred by using an extended SNMP.

Optionally, in this embodiment of the present disclosure, the unified OAM management center may receive fault alarm messages sent by MPs in the first maintenance set by using a method in the prior art. The fault alarm messages include fault information. The method in the prior art is related to an OAM technology used by the MP. The unified OAM management center queries an OAM database, to obtain a second maintenance set interacting with the first maintenance set. The second maintenance set includes MPs using a second OAM technology, and the OAM database saves interaction information of different maintenance sets. The unified OAM management center transforms the fault information into an object of a unified OAM management data model. The unified OAM management center sends a fault notification message to all MPs in the second maintenance set or an MP that is determined according to a policy in the second maintenance set. The fault notification message includes the fault information, the fault notification message is XML-form data transferred by using the NETCONF, the XML-form data is obtained by transforming the object of the unified OAM management data model, the unified OAM management data model is generated by using an IETF YANG Data Model format, and the object of the unified OAM management data model carries the fault information. That the unified OAM management data model is transformed to the XML-form data by using the IETF YANG Data Model format may be implemented by using an existing standard rule.

Optionally, in this embodiment of the present disclosure, the unified OAM management center may receive fault alarm messages sent by MPs in the first maintenance set by using a method in the prior art. The fault alarm messages include fault information. The method in the prior art is related to an OAM technology used by the MP. The unified OAM management center queries an OAM database, to obtain a second maintenance set interacting with the first maintenance set. The second maintenance set includes MPs using a second OAM technology, and the OAM database saves interaction information of different maintenance sets. The unified OAM management center sends a fault notification message to all MPs in the second maintenance set or an MP that is determined according to a policy in the second maintenance set. The fault notification message includes the fault information. The fault notification message is sent by using the method in the prior art. The method in the prior art is related to an OAM technology used by the MP.

In this way, this embodiment of the present disclosure may compatibly support sending the fault alarm message or the fault notification message by using the method in the prior art, but does not support an MP of a method based on the unified OAM management data model.

Figure 4:
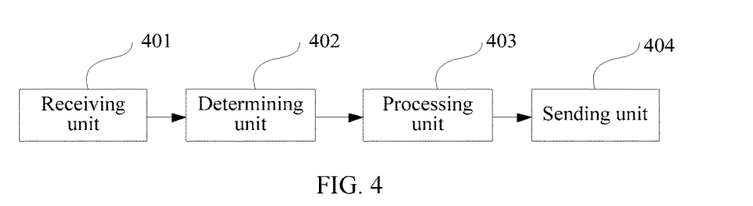
FIG. 4 is a schematic structural diagram of a unified operation, administration, and maintenance (OAM) management center according to an embodiment of the present disclosure.

As shown in FIG. 4, an embodiment of the present disclosure further provides a unified operation, administration, and maintenance (OAM) management center, including:

a receiving unit 401, configured to receive a fault alarm message sent by a maintenance point MP, where the fault alarm message includes fault information;

a determining unit 402, configured to determine, according to the fault alarm message, a first maintenance set to which the MP belongs, where the first maintenance set includes MPs using a first OAM technology;

a processing unit 403, configured to query an OAM database, to obtain a second maintenance set interacting with the first maintenance set, where the second maintenance set includes MPs using a second OAM technology, and the OAM database saves interaction information of different maintenance sets; and a sending unit 404, configured to send a fault notification message to all MPs in the second maintenance set or an MP that is determined according to a policy in the second maintenance set, where the fault notification message includes the fault information.

Optionally, the maintenance set includes a maintenance domain (MD) or a maintenance entity group (MEG).

Optionally, the determining unit 402 is specifically configured to: determine the first maintenance set according to content of the fault alarm message; or determine the first maintenance set according to a source address of the fault alarm message.

Optionally, the fault alarm message further includes location information of a fault discovery device and/or location information of a fault reporting device, and the determining unit is specifically configured to determine the first maintenance set according to at least one of the fault information, the location information of the fault discovery device, or the location information of the fault reporting device.

Optionally, the unified OAM management center further includes an establishment unit, where the establishment unit specifically includes:

a collection subunit, configured to collect information about MPs in a network managed by the unified OAM management center, where the information about the MPs includes network topology information and information about a used OAM technology that are of the MPs;

a first establishment subunit, configured to establish the maintenance sets according to the information about the MPs; and a second establishment subunit, configured to establish interaction information for a maintenance set that needs to perform OAM interaction, where the establishing interaction information for a maintenance set that needs to perform OAM interaction includes adding, to connective MPs, an interaction attribute of a connective MP interacting with another maintenance set, where when there are multiple MPs that belong to different maintenance sets on one network device, the multiple MPs are connective MPs.

Optionally, networks corresponding to the maintenance sets that need to perform OAM interaction include at least one same network device or cover a same path.

Optionally, the receiving unit 401 is specifically configured to receive XML-form data transferred by the MP by using the Network Configuration Protocol NETCONF. The XML-form data is obtained by transforming an object of a unified OAM management data model, the unified OAM management data model is generated by using an IETF YANG Data Model format, and the object of the unified OAM management data model carries the fault information.

Optionally, the sending unit 403 is specifically configured to send, to all the MPs in the second maintenance set or the MP that is determined according to the policy, the XML-form data transferred by using the NETCONF. The XML-form data is obtained by transforming the object of the unified OAM management data model, the unified OAM management data model is generated by using the IETF YANG Data Model format, and the object of the unified OAM management data model carries the fault information.

Figure 5:
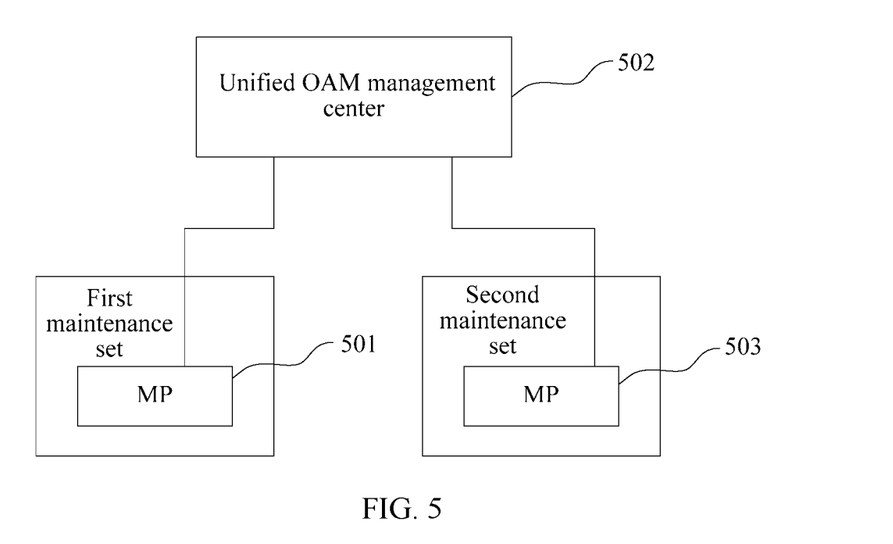
FIG. 5 is a schematic structural diagram of a network system according to an embodiment of the present disclosure.

As shown in FIG. 5, an embodiment of the present disclosure further provides a network system, including:

a maintenance point MP 501, configured to send a fault alarm message to the operation, administration, and maintenance unified OAM management center 502 described above, where the fault alarm message includes fault information;

the unified OAM management center 502 described above, configured to determine, according to the fault alarm message, a first maintenance set to which the MP belongs, where the first maintenance set includes MPs using a first OAM technology; configured to query an OAM database, to obtain a second maintenance set interacting with the first maintenance set, where the second maintenance set includes MPs using a second OAM technology, and the OAM database saves interaction information of different maintenance sets; and configured to send a fault notification message to all MPs in the second maintenance set or an MP that is determined according to a policy in the second maintenance set, where the fault notification message includes the fault information; and all the MPs 503 in the second maintenance set or the MP 503 determined according to the policy, configured to perform fault interaction according to the fault notification message.

Figure 6:
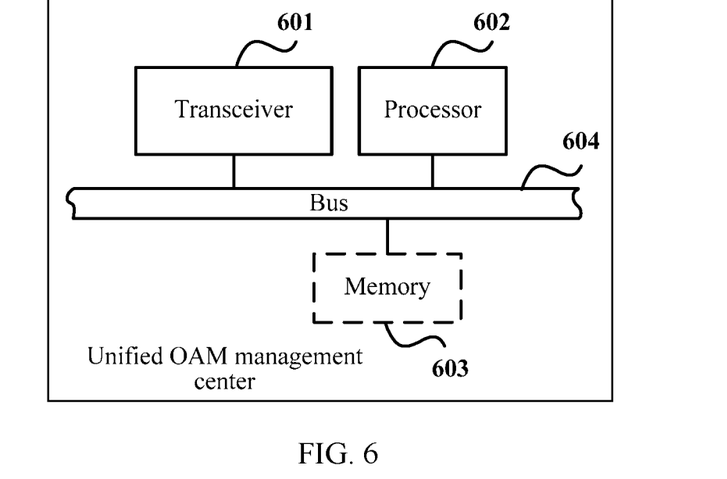
FIG. 6 is a schematic structural diagram of a unified operation, administration, and maintenance (OAM) management center according to an embodiment of the present disclosure.

As shown in FIG. 6, an embodiment of the present disclosure further provides a unified operation, administration, and maintenance (OAM) management center, including:

a transceiver 601, a processor 602, a memory 603, and a bus 604, where the transceiver 601, the processor 602, and the memory 603 are connected and implement communication with each other by using the bus 604.

The bus 604 may be an industry standard architecture (ISA) bus, a peripheral component interconnect (PCI) bus, an extended industry standard architecture (EISA) bus, or the like. The bus 604 may be classified into an address bus, a data bus, a control bus, and the like. For convenience of representation, only one line is used for representation in the figure, but it does not indicate that there is only one bus or one type of bus.

The memory 603 is configured to store program code, and the program code includes an operation instruction. The memory 603 may include a high-speed random access memory (RAM), or may include a non-volatile memory, for example, a magnetic disk storage.

The processor 602 may be a central processing unit (CPU) or an application-specific integrated circuit (ASIC), or may be one or more integrated circuits configured to implement the embodiments of the present disclosure.

The transceiver 601 may be an interface.

The transceiver 601 is configured to receive a fault alarm message sent by a maintenance point MP, where the fault alarm message includes fault information.

The processor 602 is configured to invoke the program code in the memory 603, to perform the following operations:

determining, according to the fault alarm message, a first maintenance set to which the MP belongs, where the first maintenance set includes MPs using a first OAM technology; and querying an OAM database, to obtain a second maintenance set interacting with the first maintenance set, where the second maintenance set includes MPs using a second OAM technology, and the OAM database saves interaction information of different maintenance sets.

The transceiver 601 is further configured to send a fault notification message to all MPs in the second maintenance set or an MP that is determined according to a policy in the second maintenance set, where the fault notification message includes the fault information.

Because function implementation of the apparatus according to this embodiment of the present disclosure and that of the method both belong to a same inventive concept, reference may be made to the method, and details are not described herein again.

A person of ordinary skill in the art may be aware that, in combination with the examples described in the embodiments disclosed in this specification, modules and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing system, apparatus, and module, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely an example. For example, the module division is merely logical function division and may be other division in actual implementation. For example, a plurality of modules or components may be combined or integrated into another system, or some features may be ignored or not performed. In addition, the displayed or discussed mutual couplings or direct couplings or communication connections may be implemented through some interfaces. The indirect couplings or communication connections between the apparatuses or modules may be implemented in electronic, mechanical, or other forms.

The modules described as separate parts may or may not be physically separate, and parts displayed as modules may or may not be physical modules, may be located in one position, or may be distributed on a plurality of network modules. Some or all the modules may be selected according to actual needs to achieve the objectives of the solutions of the embodiments.

In addition, functional modules in the embodiments of the present disclosure may be integrated into one processing module, or each of the modules may exist alone physically, or two or more modules are integrated into one module.

When the functions are implemented in the form of a software functional module and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network operation, administration, and maintenance (OAM) method, comprising:
receiving, by a unified OAM management center, a fault alarm message sent by a maintenance point (MP), wherein the fault alarm message comprises fault information;
determining, by the unified OAM management center according to the fault alarm message, a first maintenance set to which the MP belongs, wherein the first maintenance set comprises MPs using a first OAM technology;
querying, by the unified OAM management center, an OAM database, to obtain a second maintenance set interacting with the first maintenance set, wherein the second maintenance set comprises MPs using a second OAM technology, and wherein the OAM database stores interaction information of MPs of different maintenance sets; and
sending, by the unified OAM management center, a fault notification message to at least one MP in the second maintenance set, wherein the fault notification message comprises the fault information,
wherein the fault notification message comprises Extensible Markup Language (XML)-form data sent by using Network Configuration Protocol (NETCONF), wherein the XML-form data is obtained by transforming an object of a unified OAM management data model, wherein the unified OAM management data model is generated by using an IETF YANG Data Model format, and wherein the object of the unified OAM management data model carries the fault information.

2. The method according to claim 1, wherein the maintenance set comprises a maintenance domain (MD) or a maintenance entity group (MEG).

3. The method according to claim 1, wherein the determining, by the unified OAM management center according to the fault alarm message, the first maintenance set comprises:
determining, by the unified OAM management center, the first maintenance set according to content of the fault alarm message.

4. The method according to claim 3, wherein the fault alarm message further comprises at least one of location information of a fault discovery device or location information of a fault reporting device, and the determining, by the unified OAM management center, the first maintenance set according to content of the fault alarm message comprises:
determining, by the unified OAM management center, the first maintenance set according to at least one of the fault information, the location information of the fault discovery device, and the location information of the fault reporting device.

5. The method according to claim 1, wherein the determining, by the unified OAM management center according to the fault alarm message, the first maintenance set comprises:
determining, by the unified OAM management center, the first maintenance set according to a source address of the fault alarm message.

6. The method according to claim 1, wherein before the querying, by the unified OAM management center, the OAM database, to obtain the second maintenance set interacting with the first maintenance set, further comprising a step of establishing the OAM database, wherein the establishing, by the unified OAM management center, the OAM database comprises:
collecting, by the unified OAM management center, information about MPs in a network managed by the unified OAM management center, wherein the information about the MPs comprises network topology information and information about a used OAM technology that are of the MPs;
establishing, by the unified OAM management center, one or more maintenance sets according to the information about the MPs; and establishing, by the unified OAM management center, interaction information for a maintenance set that needs to perform OAM interaction, wherein the establishing interaction information for a maintenance set that needs to perform OAM interaction comprises adding, to connective MPs, an interaction attribute of a connective MP interacting with another maintenance set, wherein when there are multiple MPs that belong to different maintenance sets on one network device, the multiple MPs are connective MPs.

7. The method according to claim 6, wherein networks corresponding to the maintenance sets that need to perform OAM interaction comprise at least one same network device.

8. The method according to claim 6, wherein networks corresponding to the maintenance sets that need to perform OAM interaction cover a same path.

9. The method according to claim 1, wherein the fault alarm message comprises the XML-form data.

10. The method according to claim 1, wherein the fault notification message is sent to:
an MP that is determined according to a policy in the second maintenance set.

11. The method according to claim 1, wherein the fault notification message is sent to:
each MP in the second maintenance set.

12. A unified operation, administration, and maintenance (OAM) management center, comprising:
a processor; and
a non-transitory computer readable medium that stores computer-executable instructions;
wherein the processor is configured to execute the computer-executable instructions to perform operations comprising:
receiving a fault alarm message sent by a maintenance point (MP), wherein the fault alarm message comprises fault information;
determining according to the fault alarm message, a first maintenance set to which the MP belongs, wherein the first maintenance set comprises MPs using a first OAM technology;
querying an OAM database, to obtain a second maintenance set interacting with the first maintenance set, wherein the second maintenance set comprises MPs using a second OAM technology, and wherein the OAM database stores interaction information of MPs of different maintenance sets; and
sending a fault notification message to at least one MP in the second maintenance set, wherein the fault notification message comprises the fault information;
wherein the fault notification message comprises Extensible Markup Language (XML)-form data sent by using Network Configuration Protocol (NETCONF), wherein the XML-form data is obtained by transforming an object of a unified OAM management data model, wherein the unified OAM management data model is generated by using an IETF YANG Data Model format, and wherein the object of the unified OAM management data model carries the fault information.

13. The unified OAM management center according to claim 12, wherein the maintenance set comprises a maintenance domain (MD) or a maintenance entity group (MEG).

14. The unified OAM management center according to claim 12, wherein the determining according to the fault alarm message, the first maintenance set comprises:

determining the first maintenance set according to content of the fault alarm message.

15. The unified OAM management center according to claim 14, wherein the fault alarm message further comprises at least one of location information of a fault discovery device or location information of a fault reporting device, and the determining the first maintenance set according to content of the fault alarm message comprises:
determining the first maintenance set according to at least one of the fault information, the location information of the fault discovery device, and the location information of the fault reporting device.

16. The unified OAM management center according to claim 12, wherein the determining according to the fault alarm message, the first maintenance set comprises:
determining the first maintenance set according to a source address of the fault alarm message.

17. The unified OAM management center according to claim 12, wherein before the querying the OAM database, to obtain the second maintenance set interacting with the first maintenance set, the processor is configured to execute the computer-executable instructions to perform an operation comprising: establishing the OAM database, wherein the establishing the OAM database comprises:
collecting information about MPs in a network managed by the unified OAM management center, wherein the information about the MPs comprises network topology information and information about a used OAM technology that are of the MPs;
establishing one or more maintenance sets according to the information about the MPs; and
establishing interaction information for a maintenance set that needs to perform OAM interaction, wherein the establishing interaction information for a maintenance set that needs to perform OAM interaction comprises adding, to connective MPs, an interaction attribute of a connective MP interacting with another maintenance set, wherein when there are multiple MPs that belong to different maintenance sets on one network device, the multiple MPs are connective MPs.

18. The unified OAM management center according to claim 17, wherein
networks corresponding to the maintenance sets that need to perform OAM interaction comprise at least one same network device or cover a same path.

19. The unified OAM management center according to claim 12, wherein the fault alarm message comprises the XML-form data.

20. The unified OAM management center according to claim 12, wherein the fault notification message is sent to:
an MP that is determined according to a policy in the second maintenance set.

21. The unified OAM management center according to claim 12, wherein the fault notification message is sent to:
each MP in the second maintenance set.

22. A network system, comprising:
a maintenance point (MP); and
a unified operation, administration, and maintenance (OAM) management center;
wherein, the MP is configured to send a fault alarm message to the OAM management center, wherein the fault alarm message comprises fault information; and
wherein the unified OAM management center is configured to:

receive the fault alarm message, determine according to the fault alarm message, a first maintenance set to which the MP belongs, wherein the first maintenance set comprises MPs using a first OAM technology, query an OAM database, to obtain a second maintenance set interacting with the first maintenance set, wherein the second maintenance set comprises MPs using a second OAM technology, and wherein the OAM database stores interaction information of MPs of different maintenance sets, and send a fault notification message to at least one MP in the second maintenance set, wherein the fault notification message comprises the fault information;

wherein the fault notification message comprises Extensible Markup Language (XML)-form data sent by using Network Configuration Protocol (NETCONF), wherein the XML-form data is obtained by transforming an object of a unified OAM management data model, wherein the unified OAM management data model is generated by using an IETF YANG Data Model format, and wherein the object of the unified OAM management data model carries the fault information.

23. The network system according to claim 22, wherein the fault notification message is sent to:

an MP that is determined according to a policy in the second maintenance set.

24. The network system according to claim 22, wherein the fault notification message is sent to:

each MP in the second maintenance set.

* * * * *